United States Patent
Nelson et al.

(10) Patent No.: US 8,213,667 B2
(45) Date of Patent: Jul. 3, 2012

(54) HEADPHONES

(75) Inventors: Mike Nelson, Oceanside, CA (US); Eric Crane, San Clemente, CA (US); Yves Behar, Oakland, CA (US); Joshua Morenstein, San Francisco, CA (US); Pichaya Puttorngul, San Francisco, CA (US); Serge Beaulieu, San Francisco, CA (US); Matthew Swinton, San Francisco, CA (US)

(73) Assignee: Nixon, Inc., Encinitas, CA (US)

( * ) Notice: Subject to any disclaimer, the term of this patent is extended or adjusted under 35 U.S.C. 154(b) by 444 days.

(21) Appl. No.: 12/453,414

(22) Filed: May 11, 2009

(65) Prior Publication Data
US 2009/0285435 A1   Nov. 19, 2009

Related U.S. Application Data

(60) Provisional application No. 61/071,714, filed on May 14, 2008.

(51) Int. Cl.
*H04R 25/00*   (2006.01)

(52) U.S. Cl. .......................... 381/378; 381/370; 381/374
(58) Field of Classification Search .................. 381/370, 381/371, 374, 376, 378, 379
See application file for complete search history.

(56) References Cited

U.S. PATENT DOCUMENTS

| | | | |
|---|---|---|---|
| 4,027,113 A | 5/1977 | Matsumoto et al. | |
| 6,993,143 B2 * | 1/2006 | Harris et al. | 381/379 |
| 7,171,698 B2 * | 2/2007 | Saffran | 2/209 |
| 2003/0210801 A1 | 11/2003 | Naksen et al. | |
| 2006/0062417 A1 * | 3/2006 | Tachikawa | 381/378 |

OTHER PUBLICATIONS

European Search Report issued Aug. 3, 2009 in connection with corresponding EP App No. 09159913.4.

* cited by examiner

*Primary Examiner* — Jeremy Luks
(74) *Attorney, Agent, or Firm* — Nixon & Vanderhye, P.C.

(57) ABSTRACT

Headphones include a head harness and two ear pieces provided to respective ends of the head harness. Each ear piece is movably coupled to the head harness by a ball and socket arrangement structured to allow spherical articulation of each ear piece with respect to the head harness.

7 Claims, 14 Drawing Sheets

HEADPHONES

CROSS-REFERENCE TO RELATED APPLICATION

This application claims the benefit of U.S. Provisional Application No. 61/071,714, filed May 14, 2008, which is incorporated herein by reference in its entirety.

FIELD OF THE INVENTION

The present invention relates to headphones.

BACKGROUND OF THE INVENTION

Headphones are known in the art. The present invention provides improvements to known headphones to maximize comfort and portability.

SUMMARY OF THE INVENTION

One aspect of the invention relates to headphones including a head harness and two ear pieces provided to respective ends of the head harness. Each ear piece is movably coupled to the head harness by a ball and socket arrangement structured to allow spherical articulation of each ear piece with respect to the head harness.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

The following description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

1. Headphones

Figure 1:
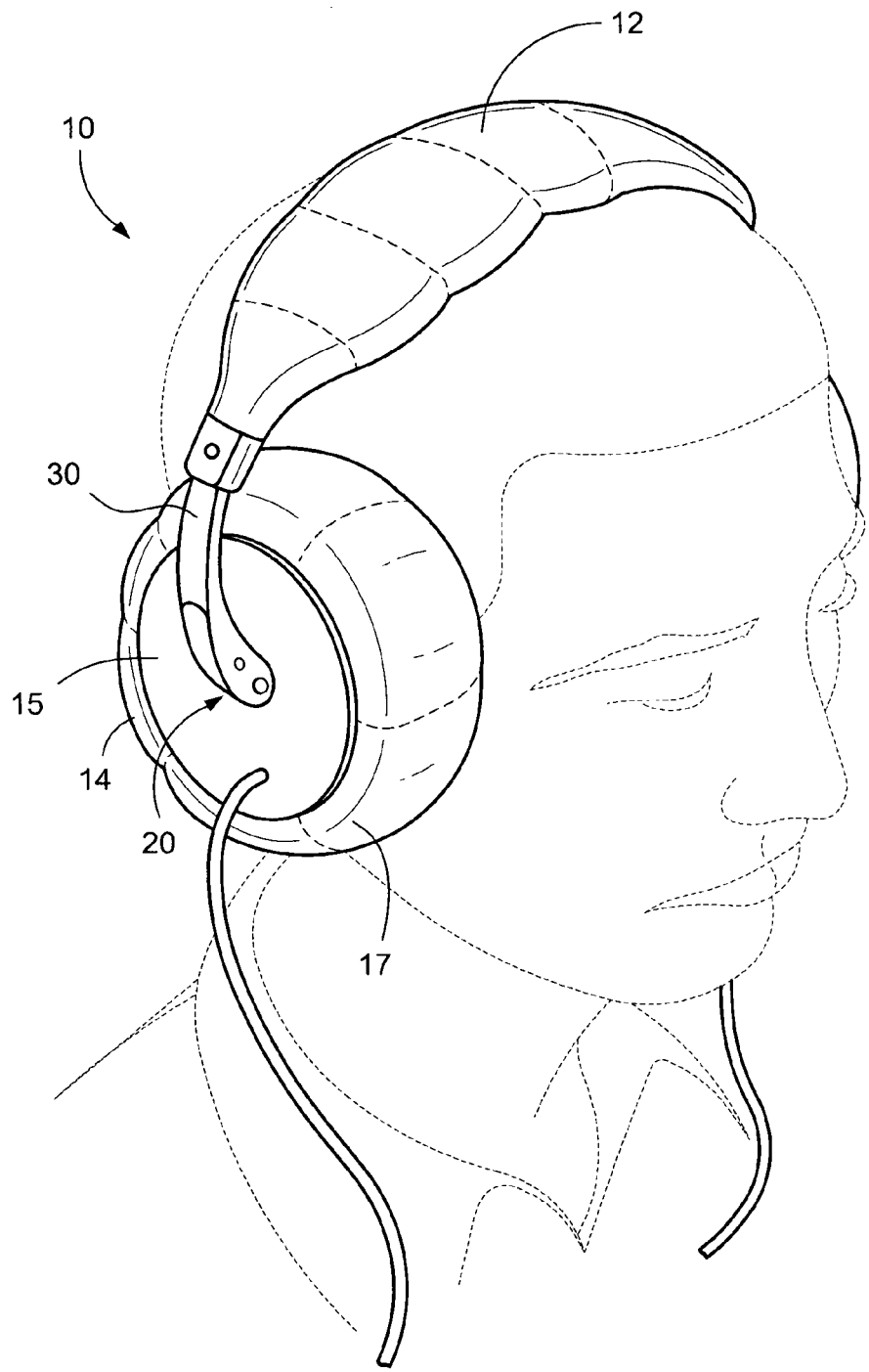
FIG. 1 is a perspective view of headphones according to an embodiment of the present invention, the headphones positioned on user's head.
Figure 2:
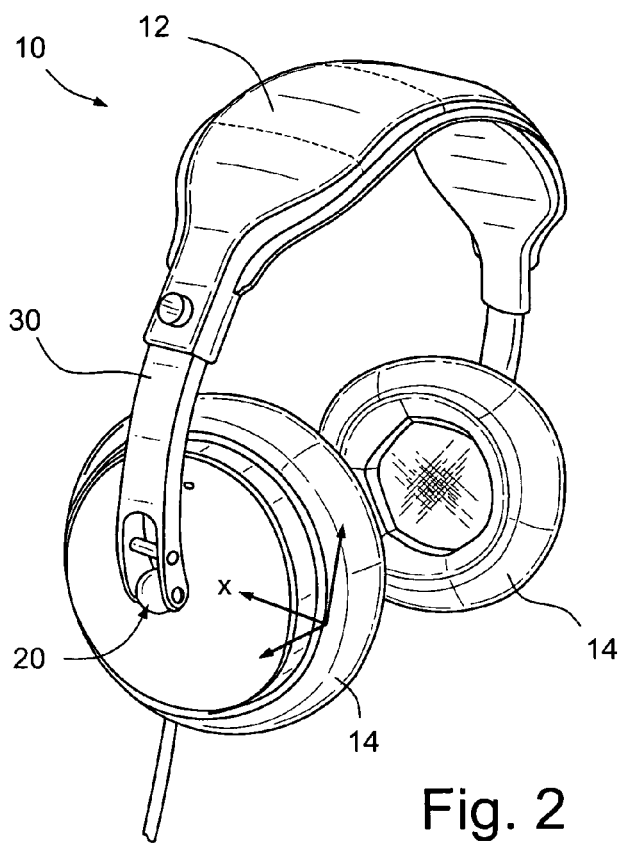
FIG. 2 is a perspective view of the headphones shown in FIG. 1 removed from the user's head.
Figure 3:
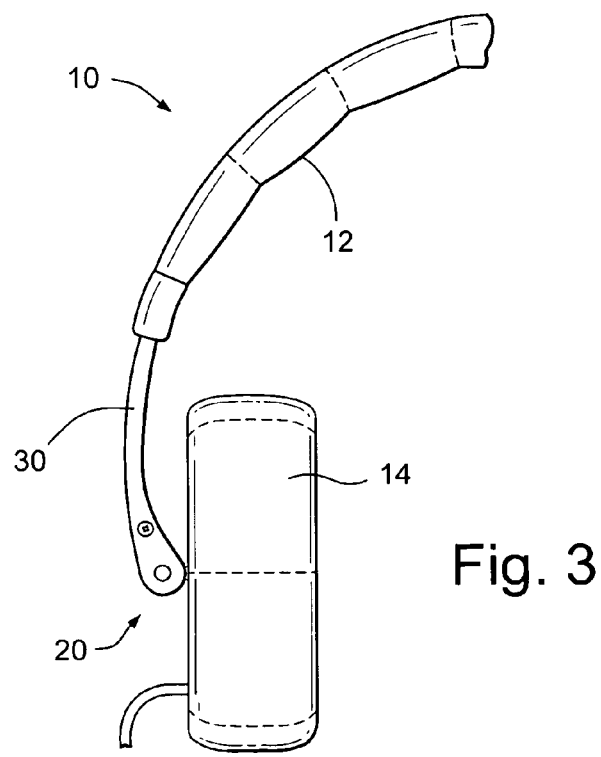
FIG. 3 is a partial front view of the headphones shown in FIG. 2.

FIGS. 1 to 3 illustrate electronic headphones 10 (e.g., audio headphones adapted to electrically communicate with an audio signal) according to an embodiment of the present invention. As illustrated, the headphones 10 include a head harness 12 (over-the-head connecting portion or bridge) and two ear pieces 14 provided to respective ends of the head harness 12. As described in greater detail below, each ear piece 14 is movably coupled to the head harness 12 by a ball and socket arrangement 20, which allows spherical articulation of each ear piece 14 with respect to the head harness 12.

The head harness 12 is structured to provide a biasing force to bias the ear pieces 14 towards one another for engaging against the user's ears in use. Each ear cushion includes a base plate 15, an ear cushion 17, and an audio unit (not shown) to produce sound.

In the illustrated embodiment, the ear pieces are of the type that surround or enclose the user's ear when the headphones are put on. However, it should be appreciated that aspects of the invention may be applicable to other types of headphones, e.g., headphones with ear pieces that sit or lie on the user's ear, insert into the user's ear, etc.

1.1 Ball and Socket Arrangement

Figure 4:
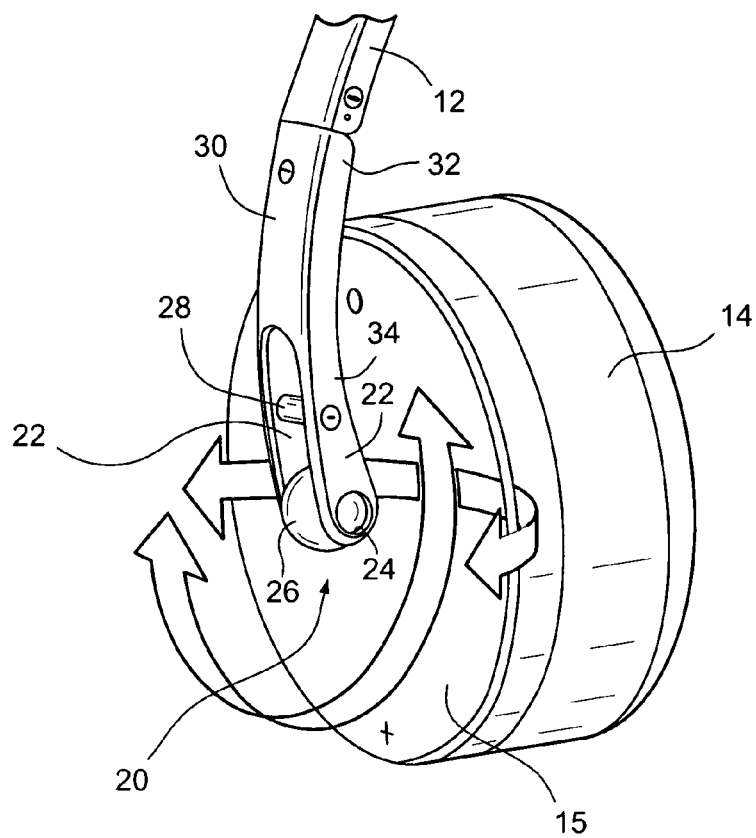
FIG. 4 is an enlarged perspective view of a portion of the headphones showing a ball and socket arrangement according to an embodiment of the present invention.

In the illustrated embodiment, an ear piece support 30 is provided to each end of the head harness 12. As shown in FIG. 4, each ear piece support 30 includes a first portion 32 coupled to the head harness 12 and a second portion 34 coupled to the ear piece 14 via the ball and socket arrangement 20.

Specifically, the second portion 34 includes two socket arms or forks 22 each containing a hole 24 adjacent the free end. The two forks 22 are structured to movably contain a ball 26 provided to the ear piece 14, i.e., ball 26 received between the two forks 22 and supported within the holes 24. A link 28 between the forks 22 further secures the ball 26 in position, i.e., link 28 prevents forks 22 from separating.

Figure 5:
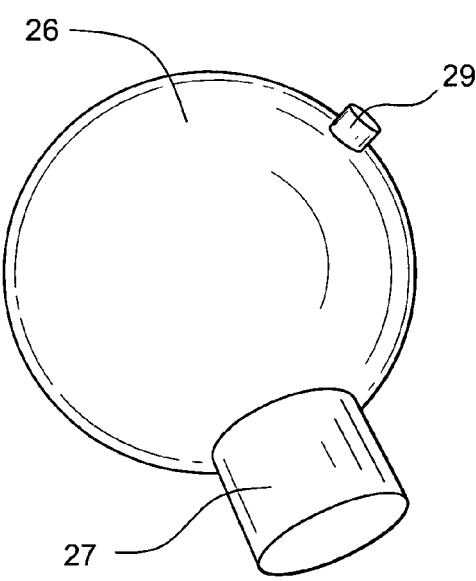
FIG. 5 is a perspective view of a ball of a ball and socket arrangement according to an embodiment of the present invention.
Figure 6A:
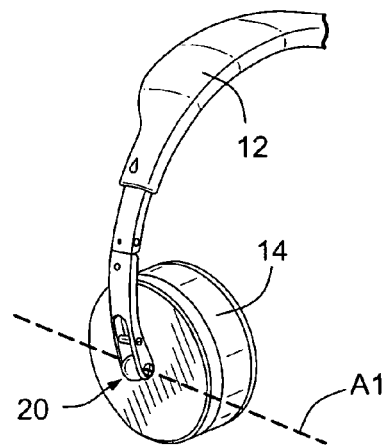
FIGS. 6*a* to 6*e* illustrate a range of vertical articulation of the headphones according to an embodiment of the present invention.
Figure 6B:
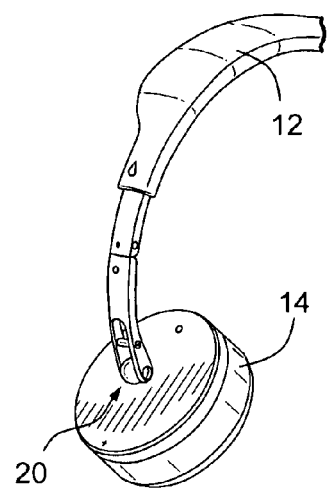
Figure 6C:
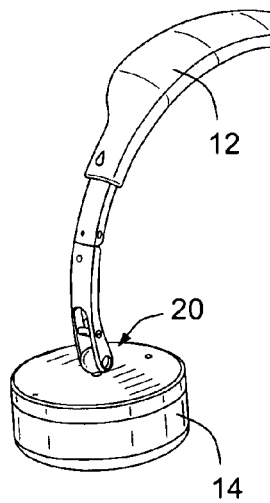
Figure 6D:
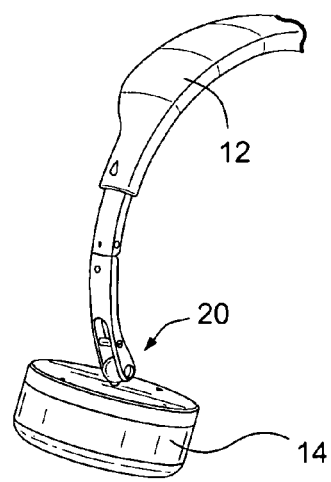
Figure 6E:
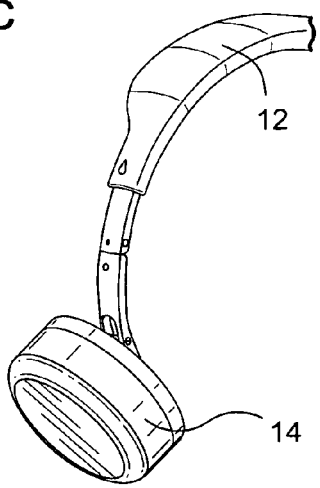

In the illustrated embodiment, the ball 26 is secured to the base plate 15 of the ear piece 14. For example, as shown in FIG. 5, the ball 26 may include a pin 27 that rigidly attaches to the base plate 15 (e.g., welded, adhesive, etc.). However, the ball may be secured to the base plate in other suitable manner, e.g., by a fastener (e.g., fastener extends through the base plate and into the ball).

In an embodiment, the ball 26 may have a diameter of about 9-15 mm, e.g., 11.5 mm, and the forks 22 may have a length of about 20-35 mm, e.g., 32 mm, with holes 24 having a diameter of about 4-8 mm, e.g., 6 mm. It is to be understood that these dimensions and ranges are merely exemplary and other dimensions and ranges are possible, e.g., depending on application.

1.2 Spherical Articulation

The ball and socket arrangement 20 (also referred to as an orbital ball joint) allows each ear piece to articulate into virtually any position on both horizontal and vertical axes. This arrangement allows for maximum comfort as the headphone will adapt to many different sizes and shapes of user heads, i.e., ball and socket arrangement assists with the ear pieces adjusting to fit any head.

Figure 7A:
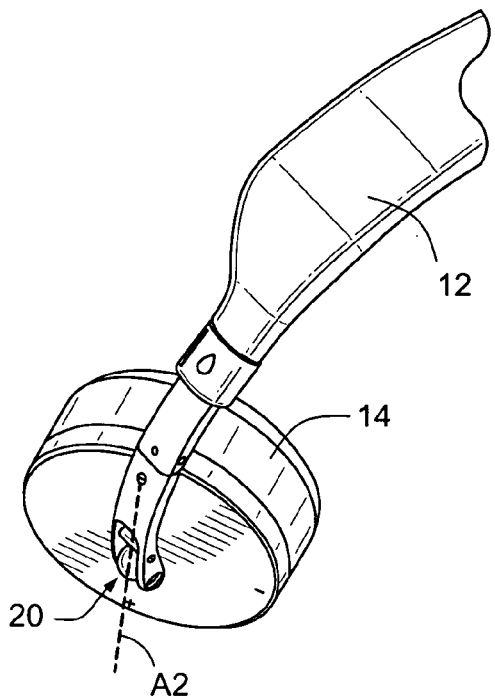
FIGS. 7*a* to 7*c* illustrate a range of horizontal articulation of the headphones according to an embodiment of the present invention.
Figure 7B:
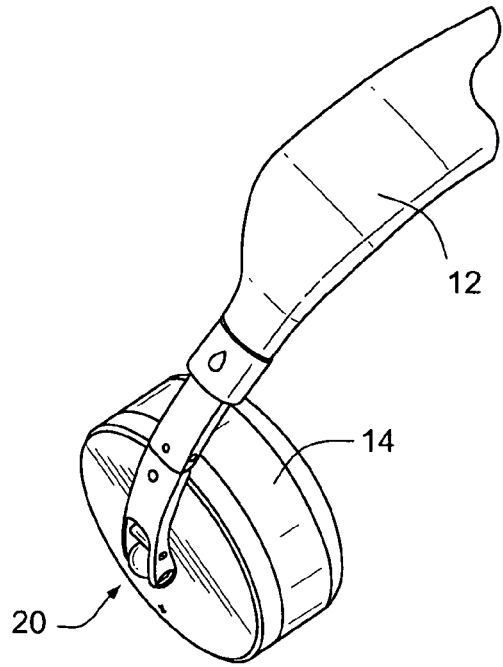
Figure 7C:
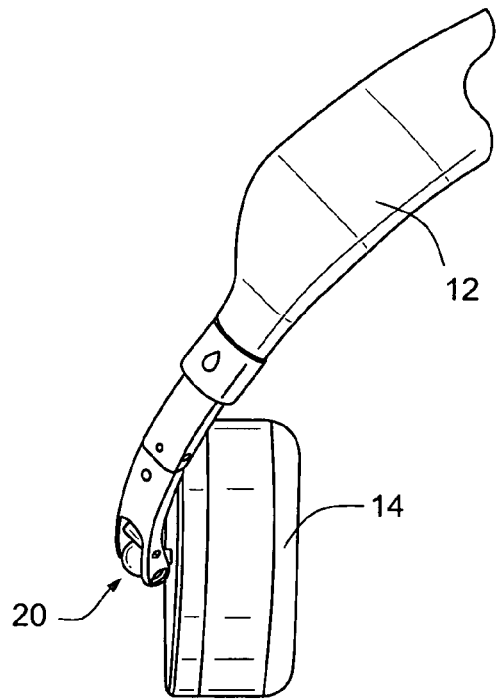

The full range of vertical articulation (e.g., articulation about axis A1) is shown in FIGS. 6a to 6e as the ear piece 14 pivots using the ball and socket arrangement 20 (e.g., up to about 180 degrees of articulation). The full range of horizontal articulation (e.g., articulation about axis A2) is shown in FIGS. 7a to 7c as the ear piece 14 pivots around the ball and socket arrangement 20 (e.g., up to about 150-180 degrees of articulation).

As shown in FIG. 5, the ball 26 may include a stop pin 29 adapted to extend through a hole 24 of one of the forks 22 and limit the amount or range of articulation provided by the ball and socket arrangement 20.

Figure 8:
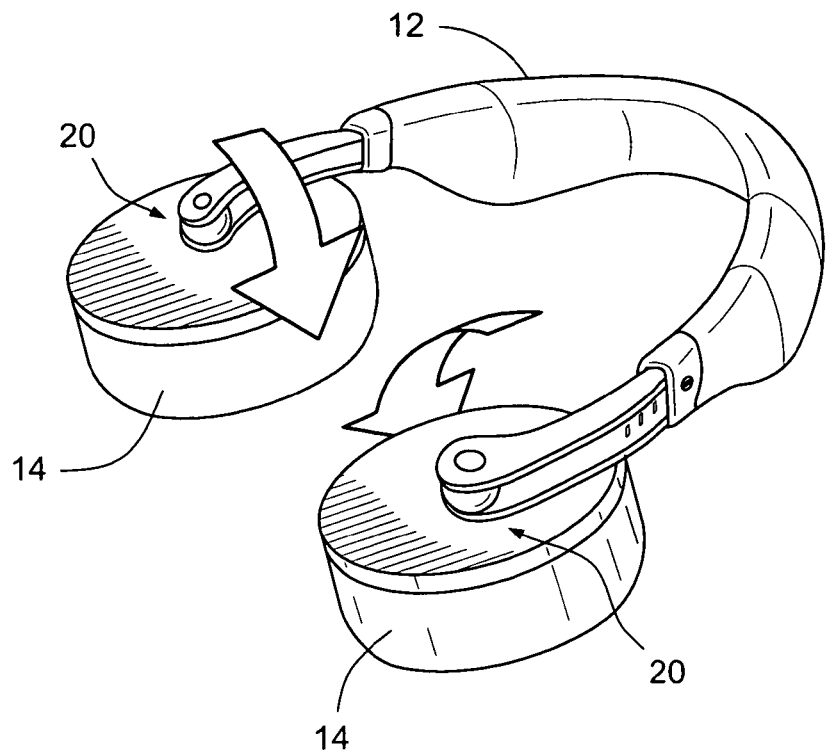
FIG. 8 is a perspective view of headphones folded into a flat, compact position according to an embodiment of the present invention.
Figure 9:
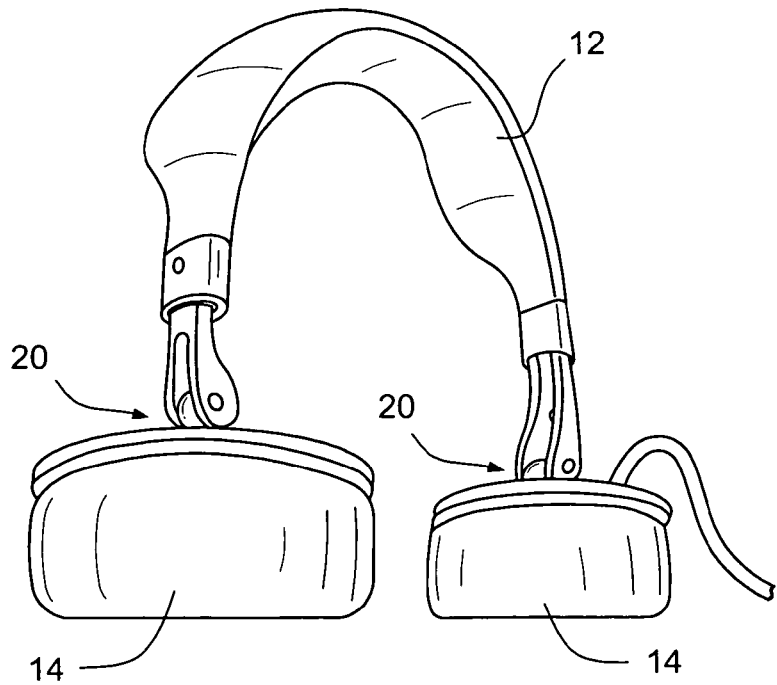
FIG. 9 is a perspective view of headphones folded into a standing, upright position.

In addition, the ball and socket arrangement 20 allows the ear pieces to be adjusted or folded into a position for portability or storage. For example, as shown in FIG. 8, the ear pieces 14 may be folded to arrange the headphones into a flat, compact position. Alternatively, as shown in FIG. 9, the ear pieces 14 may be folded to arrange the headphones into a standing, upright position (e.g., for standing on a flat surface).

1.3 Adjustable Ear Piece Support

In an embodiment, the first portion 32 of each ear piece support 30 may be movably coupled to the head harness 12 to allow relative movement between the ear piece support 30 and the head harness 12.

Figure 10:
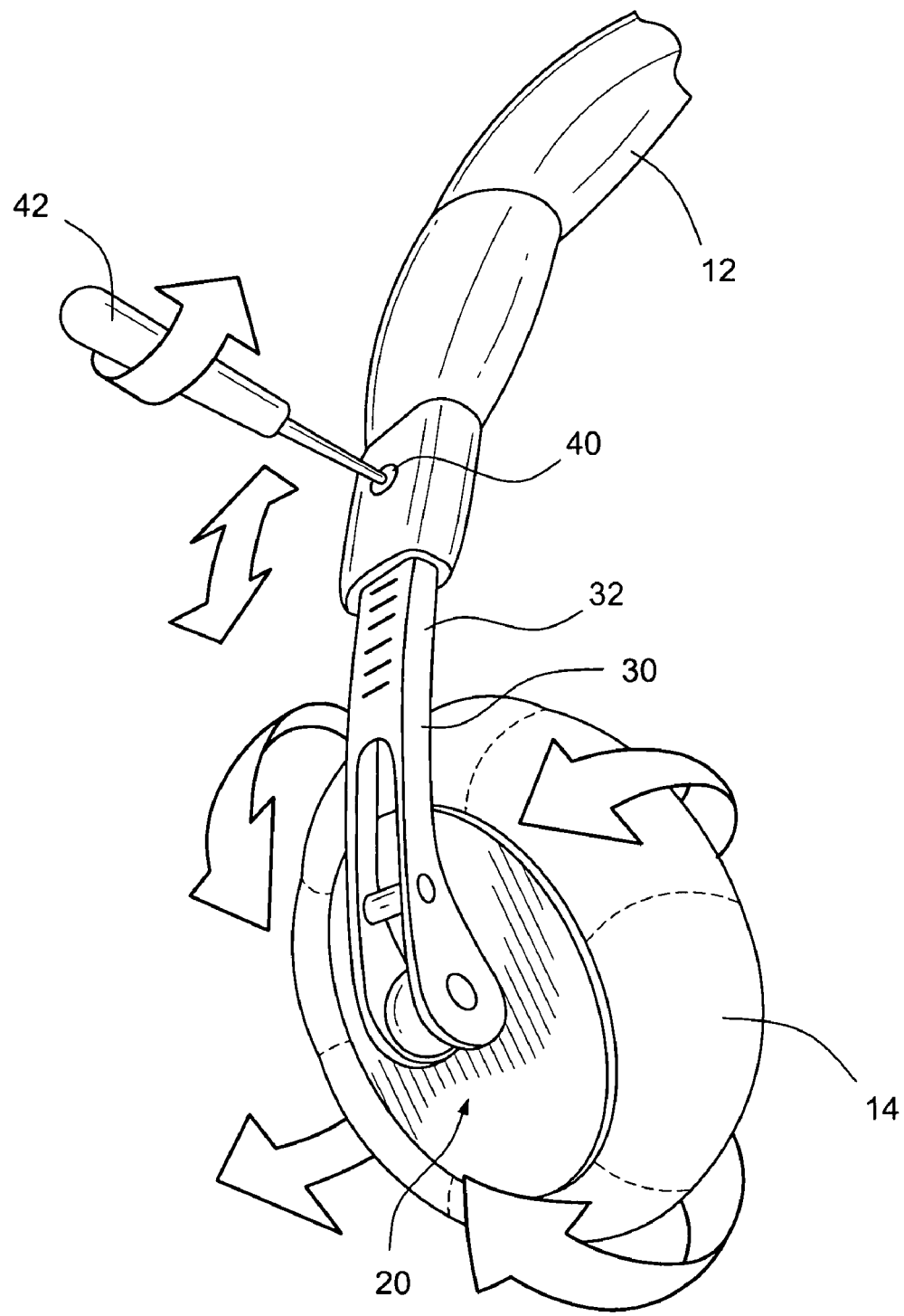
FIG. 10 is a perspective view of headphones with slidable, length adjustment according to an embodiment of the present invention.

For example, as best shown in FIG. 10, the first portion 32 may be slidably coupled to the respective end of the head harness 12 (e.g., the first portion 32 is slidably received within a hollow end portion of the head harness 12). This arrangement allows the length of the ear piece support 30 to be freely and slidably adjusted and then locked into position. The first portion may be locked into position by a fastener 40 (e.g., hex screw), which may be loosened and tightened by a key 42 (e.g., hex key) provided along with the headphones.

Figure 11:
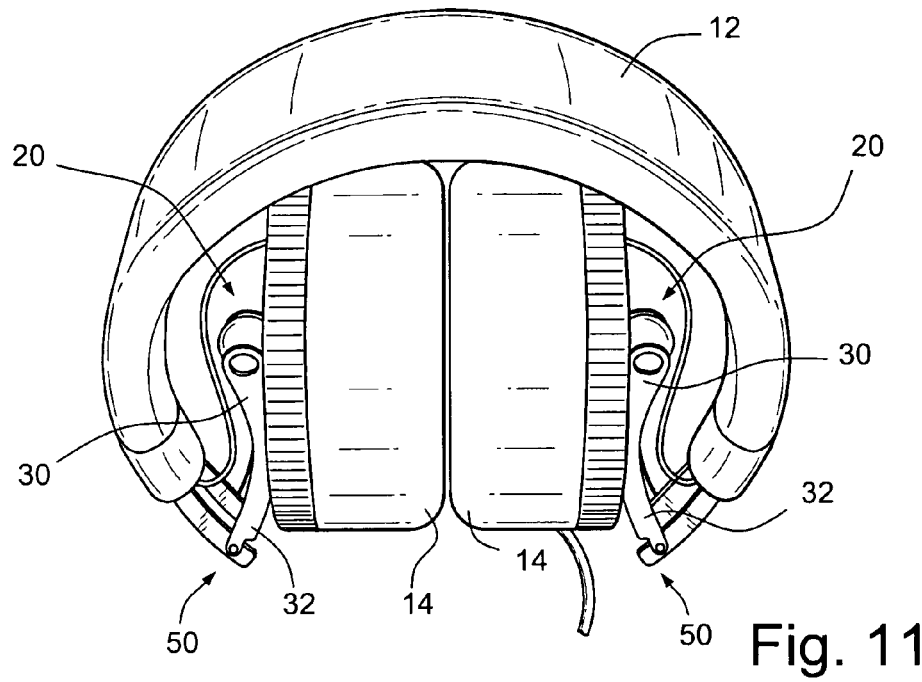
FIG. 11 is perspective view of headphones with pivotal adjustment according to an embodiment of the present invention.
Figure 12:
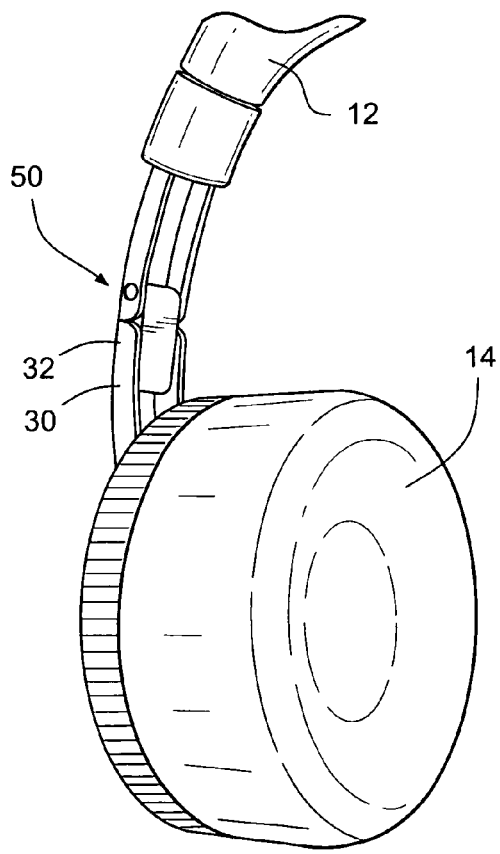
FIG. 12 is an enlarged perspective view of a portion of the headphones shown in FIG. 11.
Figure 13:
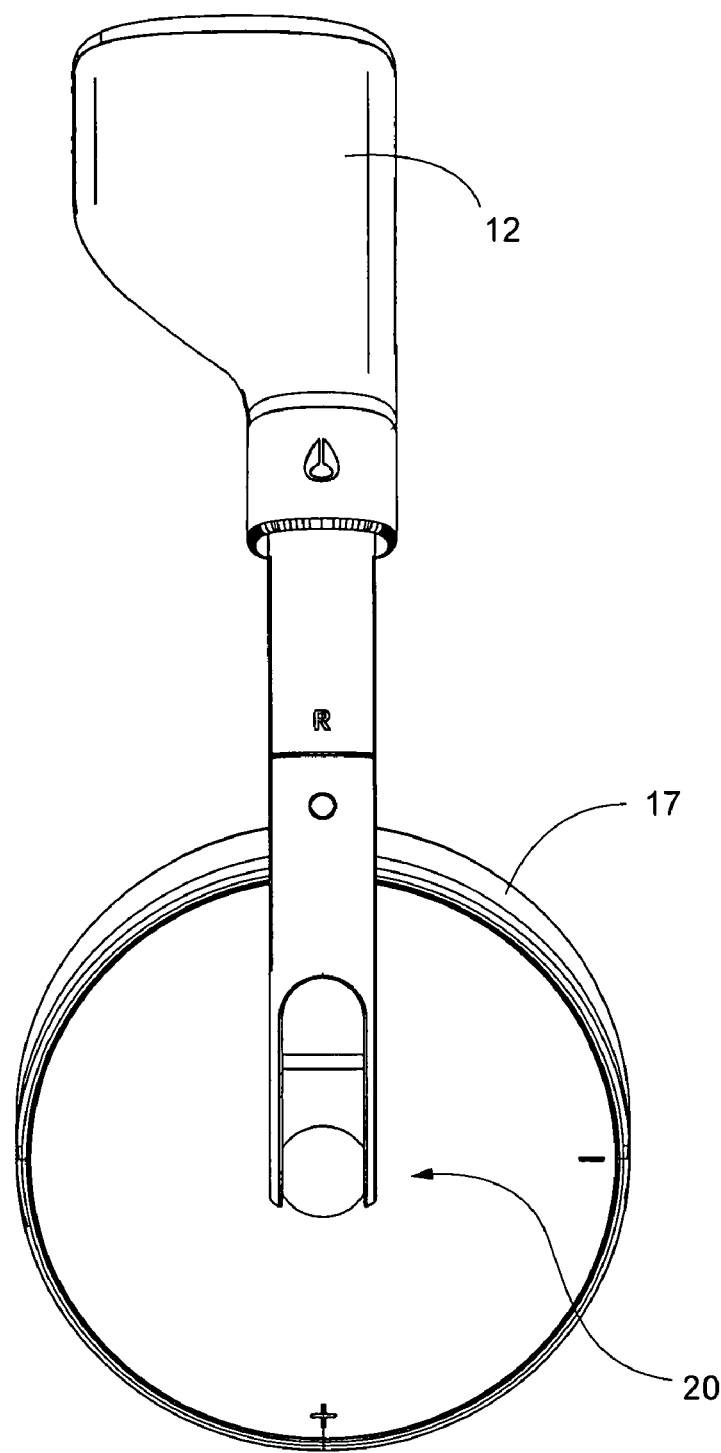
FIGS. 13, 14, and 15 are side, front, and top views of headphones according to an embodiment of the present invention.
Figure 14:
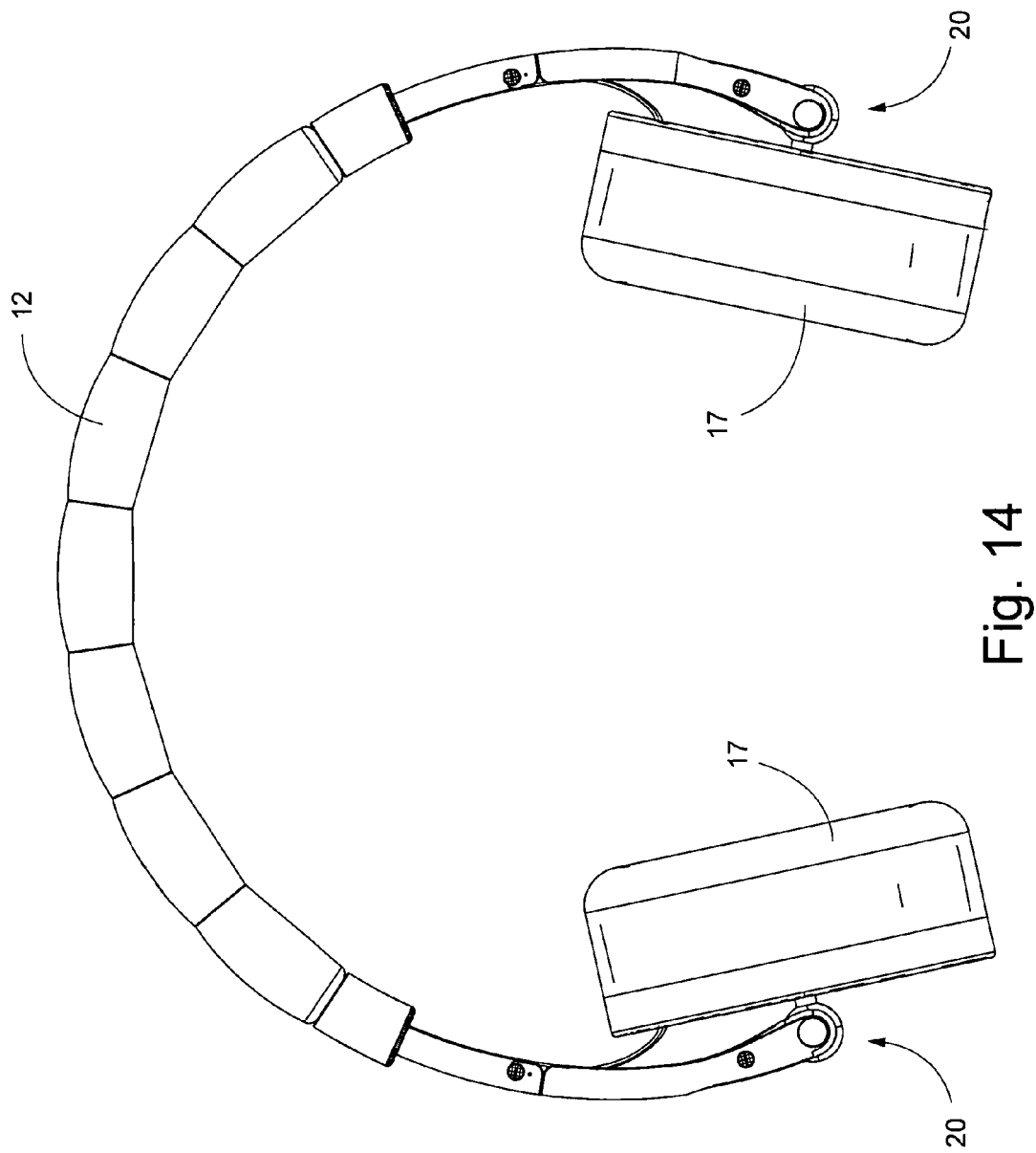
Figure 15:
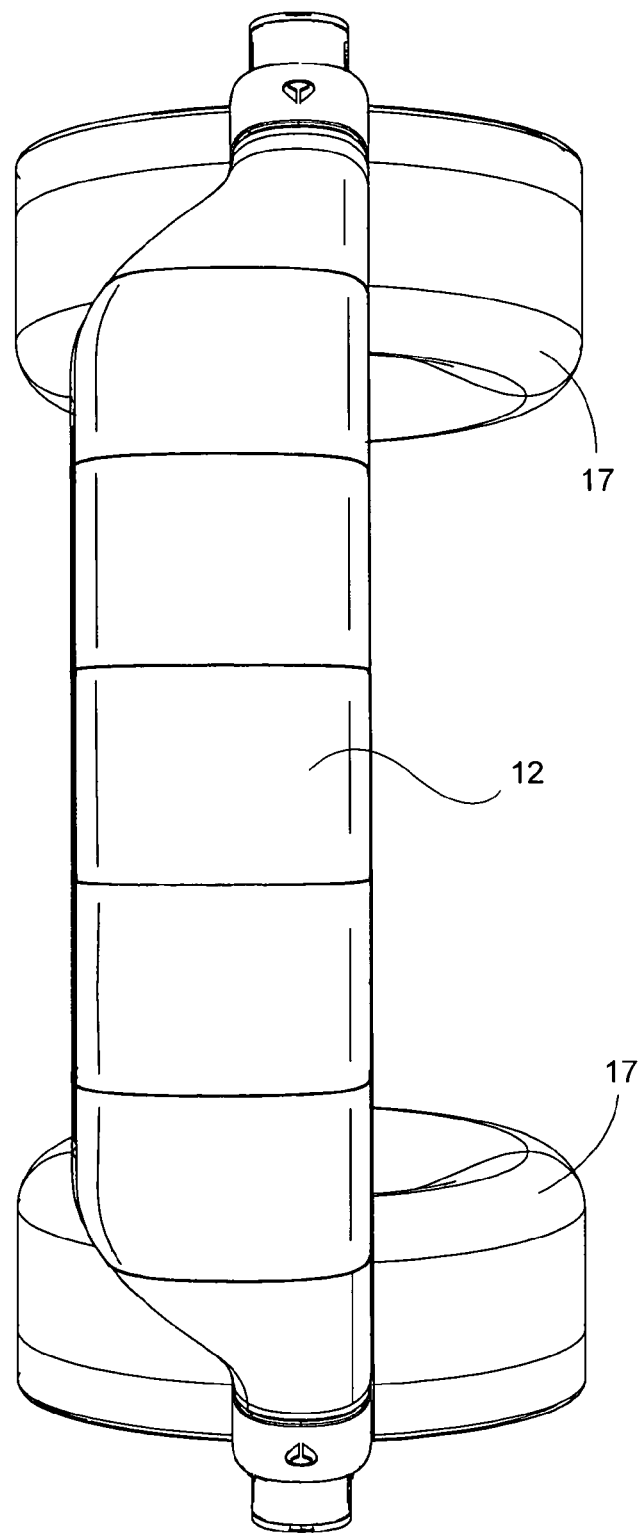

Alternatively or in addition to the slidable coupling, the first portion 32 may be pivotally coupled to the respective end of the head harness 12 (e.g., the first portion 32 is coupled to the head harness by a hinge 50 (e.g., machined metal hinge)), as shown in FIGS. 11 and 12. This arrangement allows the ear piece support 30 and ear pieces 14 coupled thereto to be folded into a compact position for storage purposes as shown in FIG. 11. The free end of the first portion 32 may provide a snap registration with the respective end of the head harness 12, e.g., to identify the "open" position as shown in FIG. 12.

1.4 Materials

In an embodiment, the head harness 12 and ear cushions 17 may include a plush leather cushion material, while the hardware (e.g., base plate, ear piece support, ball and socket arrangement) may include a metallic material. Such arrangement provides a contrast in materials, e.g., for aesthetics.

Figure 16:
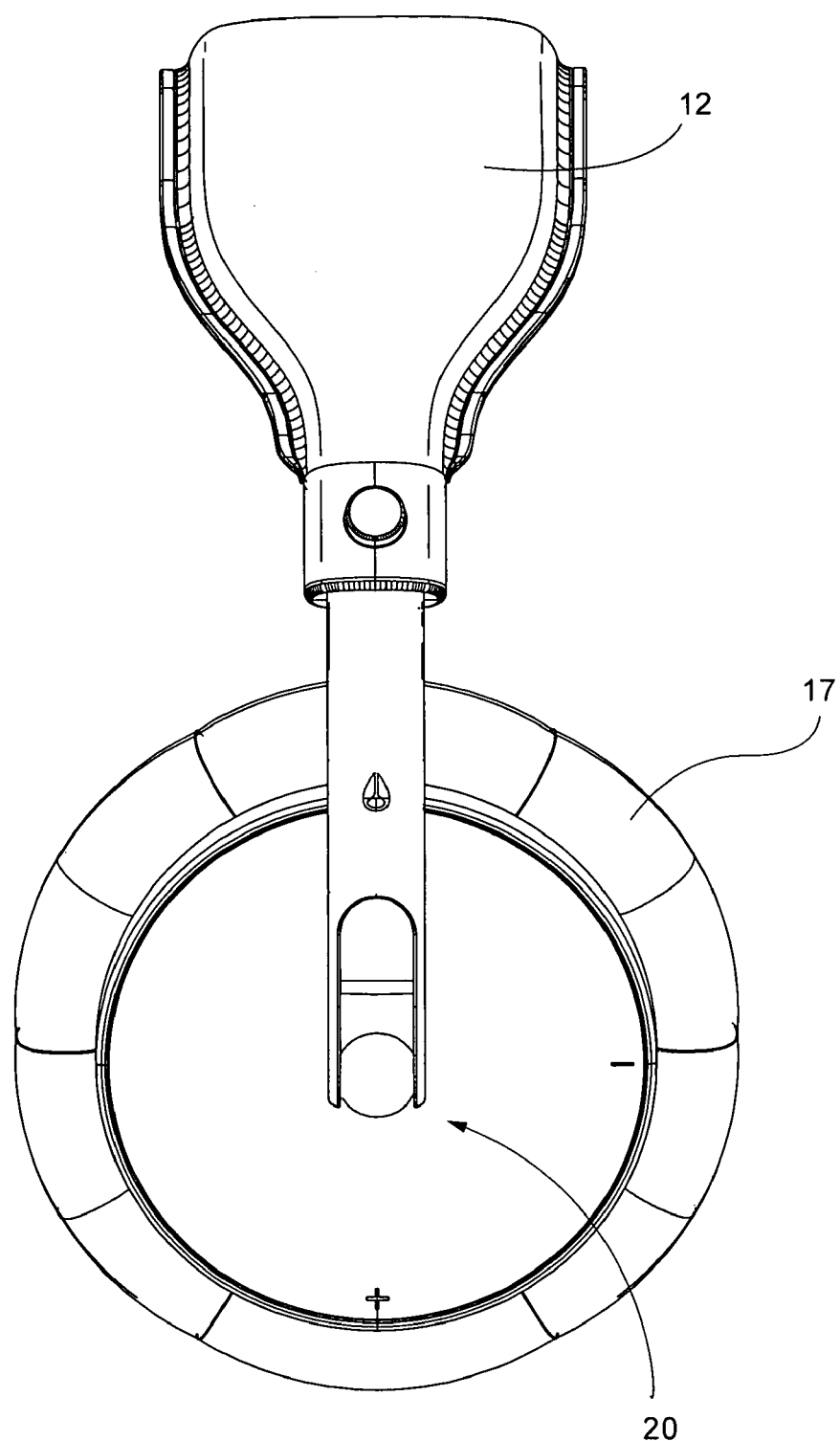
FIGS. 16, 17, and 18 are side, front, and top views of headphones according to an embodiment of the present invention.
Figure 17:
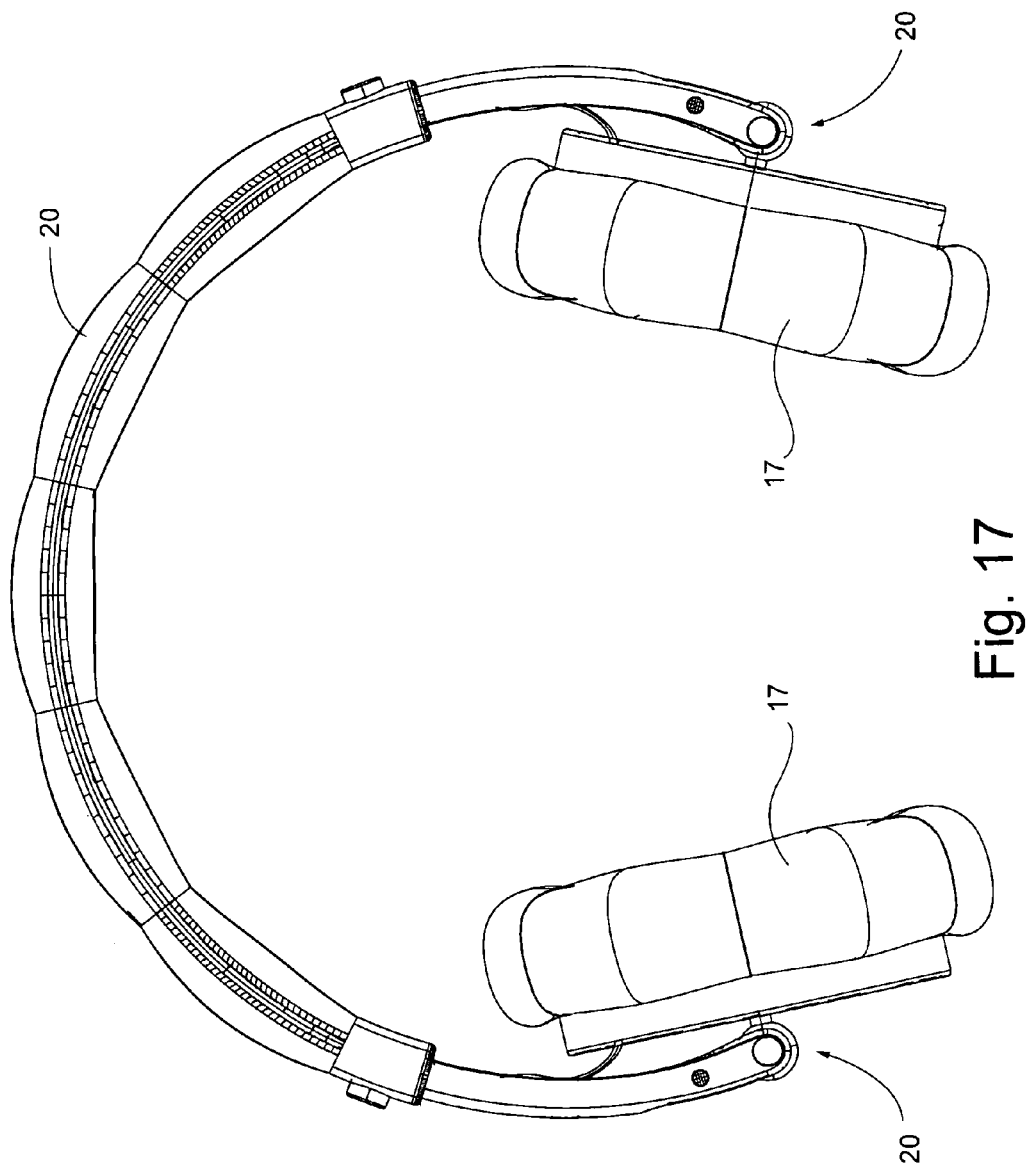
Figure 18:
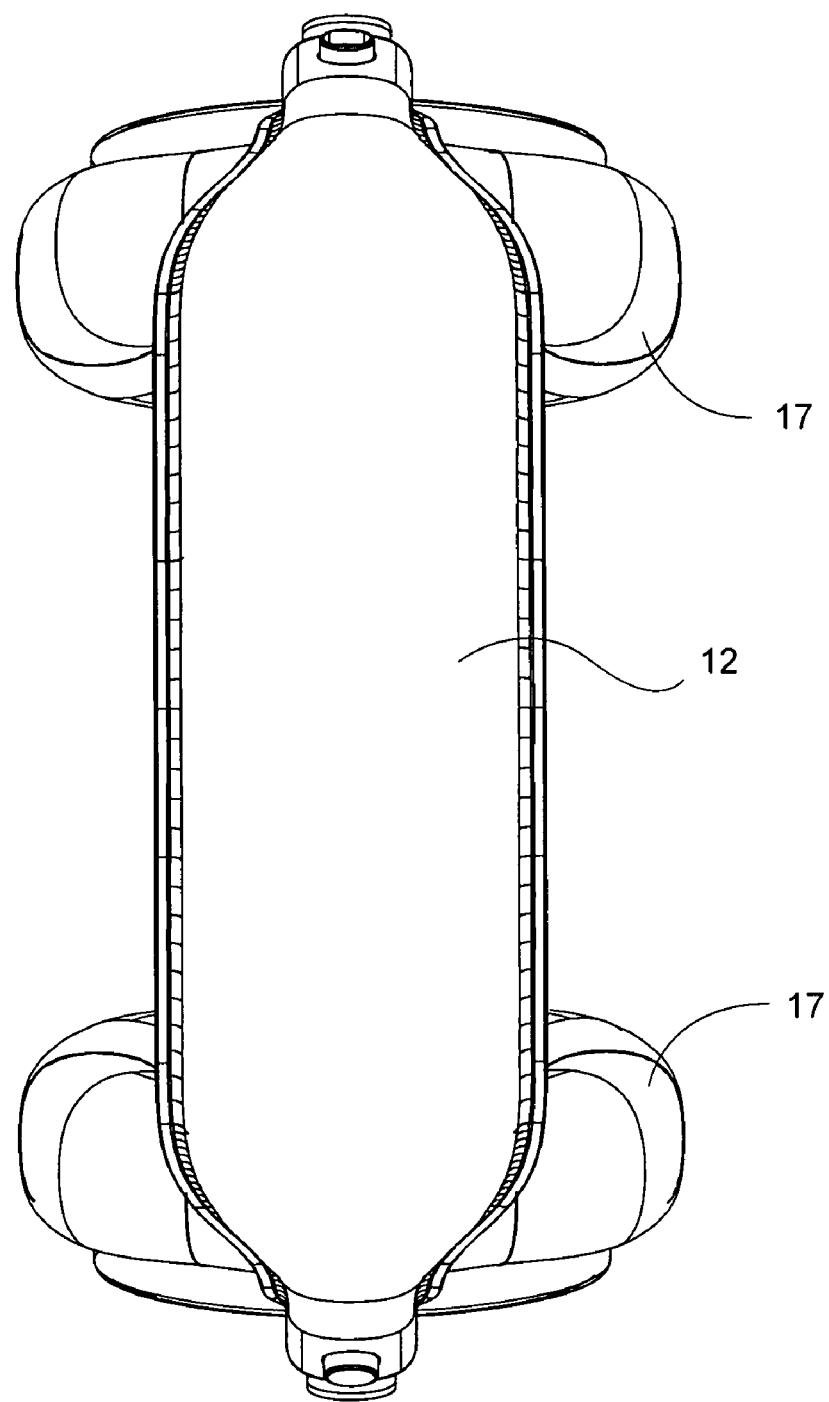

FIGS. 13-18 more clearly illustrate exemplary embodiments of the head harness 12 and ear cushions 17. As illustrated the embodiment of FIGS. 16-18 provides a wider, more plush and cushiony head harness and cushions than the embodiment of FIGS. 13-15.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. Headphones comprising:
   a head harness, and
   two ear pieces provided to respective ends of the head harness,
   each ear piece being movably coupled to the head harness by a ball and socket arrangement structured to allow spherical articulation of each ear piece with respect to the head harness,
   wherein said ball and socket arrangement comprises:
   a ball secured to a base plate of the ear piece, and
   a socket defined by a fork portion provided to the respective end of the head harness, said fork portion having two arms movably containing the ball therebetween, said arms having two opposite facing holes within which said ball is received and movably supported, so as to provide said spherical articulation.

2. Headphones according to claim 1, wherein the ear pieces are structured to surround or enclose the user's ear in use.

3. Headphones according to claim 1, wherein the ball includes a pin that is secured to a base plate of the ear piece.

4. Headphones according to claim 1, wherein the ball includes a stop pin arranged to limit the range of articulation.

5. Headphones according to claim 1, wherein the two fork arms are provided to an ear piece support that is movably mounted to the head harness.

6. Headphones according to claim 3, wherein the ear piece support is slidably coupled to the head harness to allow length adjustment.

7. Headphones according to claim 3, wherein the ear piece support is pivotally coupled to the head harness by a hinge.

* * * * *